(12) United States Patent
Iwasaki et al.

(10) Patent No.: US 6,917,505 B2
(45) Date of Patent: Jul. 12, 2005

(54) SECONDARY BATTERIES HAVING A PROTECTIVE CIRCUIT

(75) Inventors: Norikazu Iwasaki, Tochigi (JP);
Hisaya Tamura, Tochigi (JP);
Kazutaka Furuta, Tochigi (JP);
Masami Kawazu, Tochigi (JP)

(73) Assignee: Sony Chemicals Corp., Tokyo (JP)

( * ) Notice: Subject to any disclaimer, the term of this patent is extended or adjusted under 35 U.S.C. 154(b) by 260 days.

(21) Appl. No.: 10/240,649

(22) PCT Filed: Jan. 17, 2002

(86) PCT No.: PCT/JP02/00272
§ 371 (c)(1),
(2), (4) Date: Oct. 4, 2002

(87) PCT Pub. No.: WO02/063739
PCT Pub. Date: Aug. 15, 2002

(65) Prior Publication Data
US 2003/0134183 A1 Jul. 17, 2003

(51) Int. Cl.[7] .................................................. H02H 5/04
(52) U.S. Cl. ..................................... 361/104; 361/93.8
(58) Field of Search .............................. 361/93.1, 93.8, 361/93.9, 91.1, 90, 103, 104, 106; 320/134, 135, 136, 137, 150, 154

(56) References Cited

U.S. PATENT DOCUMENTS 6,518,731 B2 * 2/2003 Thomas et al. ............. 320/136
6,700,766 B2 * 3/2004 Sato .......................... 361/93.1
2001/0008167 A1   7/2001 Furuta et al. ............... 337/167
2001/0044168 A1  11/2001 Furuuchi et al. ............ 438/107

FOREIGN PATENT DOCUMENTS

| EP | 0 715 328 A1 | 6/1996 | ........ H01H/85/048 |
| EP | 0 908 902 A2 | 4/1999 | ............ H01C/7/02 |
| EP | 1 041 597 A2 | 10/2000 | ........ H01H/85/046 |
| EP | 1 045 418 A2 | 10/2000 | .......... H01H/85/46 |
| EP | 1 047 092 A2 | 10/2000 | .......... H01H/85/46 |
| EP | 1 073 175 A2 | 1/2001 | .......... H02H/9/04 |
| EP | 1 156 527 A2 | 11/2001 | ........ H01L/23/525 |
| JP | A 7-153367 | 6/1995 | .......... H01H/85/00 |
| JP | A 8-172001 | 7/1996 | ............ H01C/7/02 |
| JP | A 8-236305 | 9/1996 | ............ H01C/7/02 |
| JP | A 2001-52903 | 2/2001 | ............ H01C/7/02 |
| JP | A 2001-216883 | 8/2001 | .......... H01H/85/00 |
| JP | A 2001-313202 | 11/2001 | ............ H01C/7/02 |

* cited by examiner

*Primary Examiner*—Ronald Leja
(74) *Attorney, Agent, or Firm*—Oliff & Berridge, PLC

(57) ABSTRACT

A protective circuit for a secondary battery is formed with a heater and a thermistor that are connected in parallel, and a main fuse is connected in series with the parallel circuit. In a secondary battery equipped with this protective circuit, a charging/discharging current passes through the protective circuit and is limited by the operation of the thermistor when the voltage applied during abnormal conditions is relatively low. On the other hand, the current will cause the main fuse to blow when the voltage during abnormal conditions is high.

3 Claims, 3 Drawing Sheets

SECONDARY BATTERIES HAVING A PROTECTIVE CIRCUIT

BACKGROUND OF THE INVENTION

1. Field of Invention

The present invention relates to the field of rechargeable secondary batteries, particularly to secondary batteries containing a protective circuit.

2. Description of Related Art

Secondary batteries having a protective circuit are used in cellphones or portable personal computers and there are demands for safer protective circuits with higher charging capacity.

In FIG. 6, a secondary battery 101 of the prior art is depicted. The secondary battery 101 comprises an accumulator 107 and a fuse 111.

One end of fuse 111 is connected to a terminal of accumulator 107 on the high voltage side and the other end is connected to an external connection terminal 117 on the high voltage side. The terminal of accumulator 107 on the low voltage side is connected to an external connection terminal 118 on the low voltage side.

When an external DC voltage source 130 is connected to external connection terminals 117, 118, a current supplied from external DC voltage source 130 passes through fuse 111 to charge accumulator 107.

If external connection terminals 117, 118 are short-circuited or an external DC voltage source 130 outputs a voltage exceeding a prespecified voltage is connected to such a secondary battery 101, a large current passes through fuse 111, which causes fuse 111 to blow. This protects the accumulator 107, which otherwise would generally arise a safety problem when the accumulator in the secondary battery breaks.

However, fuse 111 must be changed if external connection terminals 117, 118 are short-circuited by accident in the production line or the like because secondary battery 101 becomes unusable when fuse 111 blows.

Secondary battery 102 shown in FIG. 7 comprises a thermistor 114 in place of fuse 111, and if external connection terminals 117, 118 are short-circuited or a high voltage is applied between external connection terminals 117, 118, the resistance value of thermistor 114 per se increases by a rise in the temperature of thermistor 114 to limit the charging/discharging current to accumulator 107.

When abnormal conditions such as short circuit or high voltage application are eliminated and thermistor 114 is restored to normal temperature, the resistance value of thermistor 114 returns to the original value to allow secondary battery 102 to be reused.

However, if an especially high voltage is applied between external connection terminals 117, 118, the high voltage is also applied across thermistor 114, which involves the danger of the breakage of thermistor 114 resulting in the breakage of accumulator 107.

The present invention overcomes the disadvantages of the prior art described above with the purpose of providing a highly safe secondary battery.

SUMMARY OF THE INVENTION

To solve the problems described above, the present invention provides a secondary battery comprising an accumulator, a protective circuit and external connection terminals, wherein the protective circuit includes a heater that generates heat when a voltage is applied, a main fuse connected in series with the heater in such a manner that it is heated by the heater and breaks at a specified blowout temperature, and a thermistor connected in parallel with the heater and having a resistance value increasing by heating, and when the external connection terminals are connected to a DC voltage source, a current supplied from the DC voltage source charges the accumulator through the protective circuit, and when the external connection terminals are connected to an electronic apparatus, a current discharged from the accumulator is supplied to the electronic apparatus through the protective circuit.

The present invention also provides the secondary battery wherein the main fuse does not reach the blowout temperature under the current passing through the protective circuit when the external connection terminals are short-circuited, but the main fuse heats up to or above the blowout temperature when the external connection terminals are connected to a voltage source 1.5 times or more the rated charging voltage of the accumulator provided that the accumulator is not charged to the full charge voltage.

The present invention also provides the secondary battery wherein an auxiliary fuse is connected in series with the thermistor and a series circuit consisting of the thermistor and the auxiliary fuse is connected in parallel with the heater.

According to the present invention as defined above, the charging/discharging current to the accumulator mainly passes through the thermistor because the thermistor and the heater are connected in parallel and the resistance value of the thermistor is low at normal temperature.

If a large current is passed through the thermistor during abnormal conditions, however, the resistance value of the thermistor increases by the large current to limit current.

With the increase of the resistance value of the thermistor, the current passing through the heater increases to enhance heat generation of the heater so that the main fuse blows.

As a result, current is limited by the thermistor when the current passing through the protective circuit during abnormal conditions is relatively small. If normal state is regained in this case, the secondary battery also recovers.

When the current flowing during abnormal conditions is large, however, the main fuse blows to ensure safety.

The main fuse can be designed in such a manner that it does not blow when the external connection terminals are short-circuited if the accumulator is fully charged, but it blows when the external connection terminals are connected to a voltage source 1.5 times or more the rated charging voltage of the accumulator if the accumulator is not charged to the full charge voltage.

In order that the main fuse may also blow when the external connection terminal arc connected to the voltage source while the accumulator is fully charged, the main fuse can be designed to blow when the external connection terminals are connected to a voltage source exceeding 2.0 times the rated charge voltage.

Figure 1:
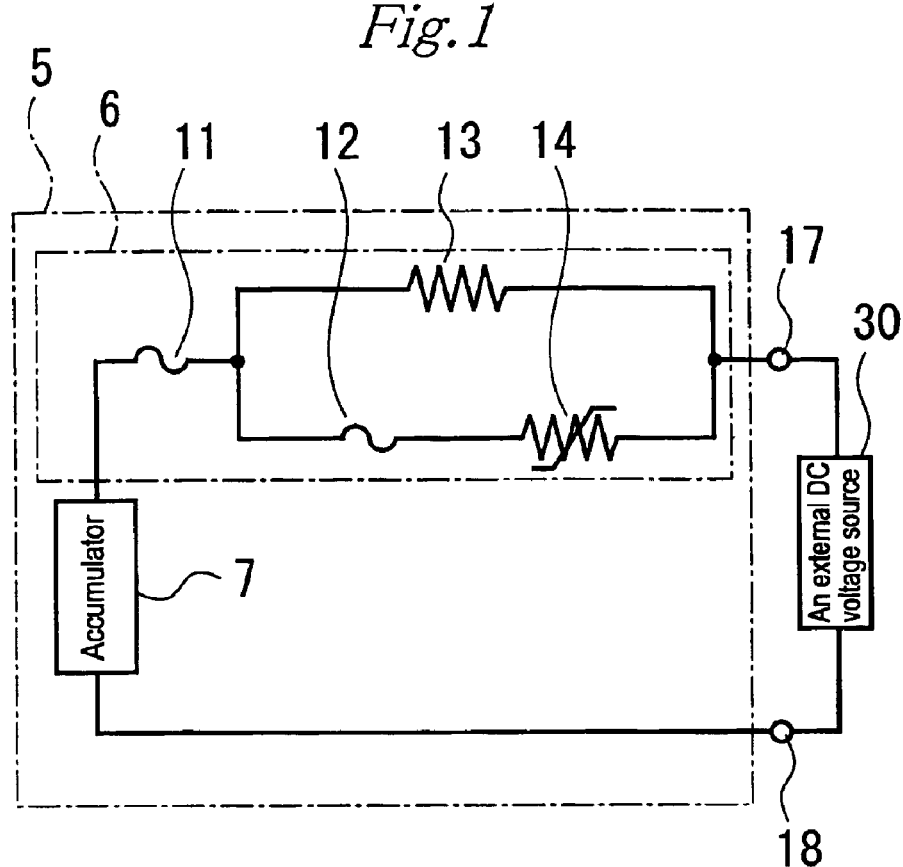
FIG. 1 is a block diagram for illustrating a secondary battery of the present invention.

Various references in the drawings represent the following elements: 5, secondary battery; 6, protective circuit; 7, accumulator; 11, main fuse; 12, auxiliary fuse; 13, heater; 14, thermistor; 17, 18, external connection terminals.

DETAILED DESCRIPTION OF PREFERRED EMBODIMENTS

In FIG. 1, is shown an example of secondary battery 5 of the present invention is shown.

This secondary battery 5 comprises a protective circuit 6, an accumulator 7 and two external connection terminals 17, 18.

Protective circuit 6 includes a main fuse 11, an auxiliary fuse 12, a heater 13 and a thermistor 14.

Auxiliary fuse 12 and thermistor 14 are connected in series, and heater 13 is connected in parallel with thus formed series circuit.

Main fuse 11 is connected in series with thus formed parallel circuit, and one end of main fuse 11 and one end of the parallel circuit are connected to the terminal of accumulator 7 on the high voltage side and one external connection terminal 17, respectively. Thus, accumulator 7 and protective circuit 6 are connected in series.

The terminal of accumulator 7 on the low voltage side is connected to the other external connection terminal 18, so that when two external connection terminals 17, 18 are connected to an external DC voltage source 30, a current supplied from external DC voltage source 30 passes through protective circuit 6 to charge accumulator 7.

Protective circuit 6 and accumulator 7 are received in the same case, and after accumulator 7 has been fully charged, it is detached from external power source 30 together with protective circuit 6 and then attached to an electronic apparatus such as a cellphone to supply power to the electronic apparatus via external connection terminals 17, 18.

Next, the inner structure of protective circuit 6 is explained.

Figure 2:
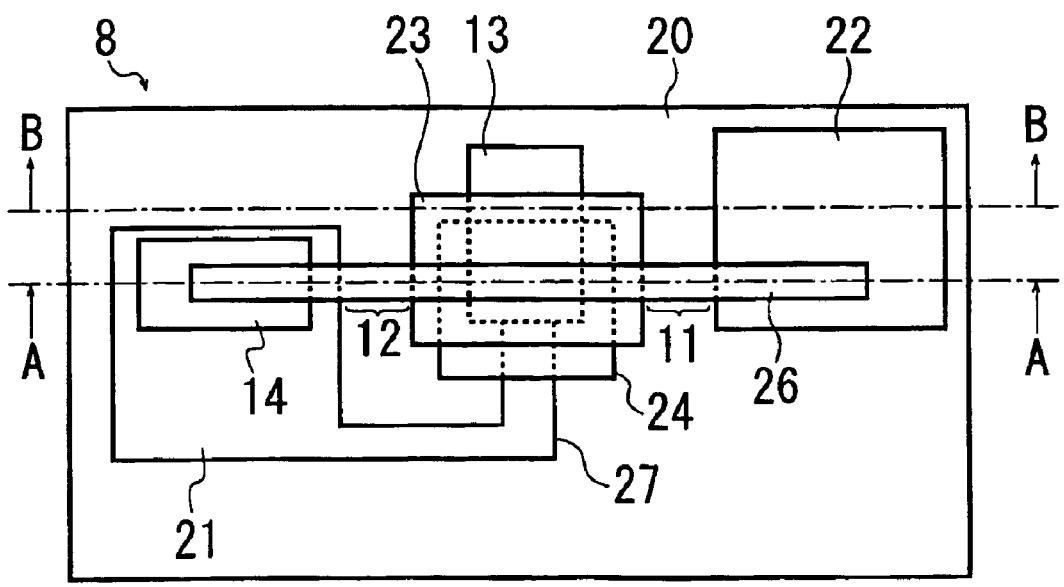
FIG. 2 is a plan view of the secondary battery of the present invention.

FIG. 2 shows a wiring board 8 on which protective circuit 6 is formed. FIG. 2 is a plan view of wiring board 8, FIG. 3 is a sectional view taken along line A—A in FIG. 2, and FIG. 4 is a sectional view taken along line B—B in FIG. 2.

Figure 3:
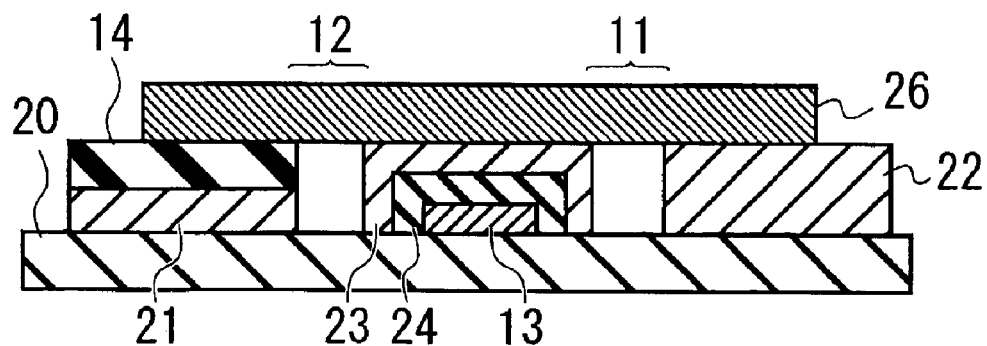
FIG. 3 is a sectional view taken along line A—A in FIG. 2.
Figure 4:
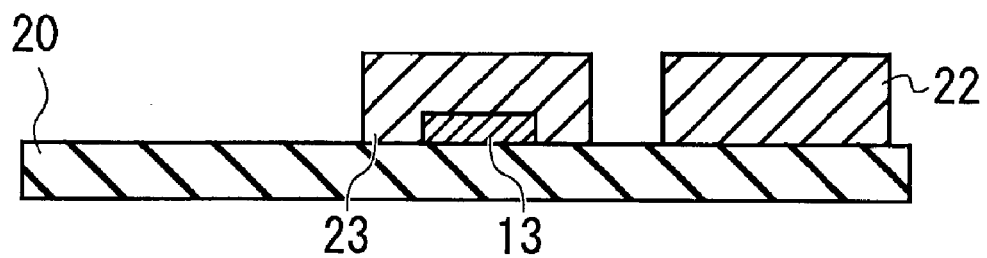
FIG. 4 is a sectional view taken along line B—B in FIG. 2.

Referring to FIGS. 2–4, this wiring board 8 comprises an insulating substrate 20 made of alumina having a thickness of about 0.5 mm.

On insulating substrate 20 are provided a heater 13, a thermistor 14, an insulating layer 24, first to third electrodes 21–23, a metal foil 26 and a wiring film 27.

Initially, a process for preparing thermistor 14 is explained.

Fifty-seven parts by volume of a high-density polyethylene (HDPE: sold by Mitsui Chemicals Inc. under the name of Hi-Zex 5000H), 3 parts by volume of an ethylene-ethyl acrylate copolymer (EEA: sold by Nippon Unicar Co., Ltd. under the name of NUC6170) and 40 parts by volume of conductive particles (electrolessly plated graphite particles sold by Nippon Carbon Co., Ltd. under the name of PC1020) were kneaded at 190° C. using a kneader, and then hot pressed between sheets of electrolytic nickel foil having a thickness of 35 µm (sold by Fukuda Metal Foil & Powder Co., Ltd.) at 190° C. under 5 kg/cm² for 60 seconds to give a thermistor precutted sheet having a thickness of 400 µm.

The thermistor precutted sheet was cut into a size of 2 mm×2 mm to give thermistor 14.

Next, a process for preparing wiring board 8 is explained. A silver paste (QS174 sold by Du Pont Kabushiki Kaisha) and a ruthenium oxide-based resistive paste (DP1900 sold by Du Pont Kabushiki Kaisha) were first applied in a predetermined pattern on insulating substrate 20 and baked at 870° C. for 30 minutes to form first and second electrodes 21, 22 from the silver paste and heater 13 from the ruthenium oxide-based resistive paste. First electrode 21 and heater 13 are connected via wiring film 27.

Then, a silica-based insulating paste (AP5364 sold by Du Pont Kabushiki Kaisha) was partially applied on the surface of heater 13 and baked at 500° C. for 30 minutes to form insulating layer 24. This insulating layer 24 covers the surface of heater 13 on the side connected to wiring film 27 while the surface of heater 13 opposite to the side connected to wiring film 27 is exposed.

Then, the silver paste was applied on the surface of insulating layer 24 and the exposed surface of heater 13 and baked to form third electrode 23. Baking conditions involved the same temperature and period as used to form first and second electrodes 21, 22 and wiring film 27. As shown in FIG. 4, this third electrode 23 is also formed on the exposed part of heater 13 so that both are electrically connected to each other at that part.

Then, preliminarily prepared thermistor 14 is mounted on first electrode 21 so that thermistor 14, third electrode 23 and second electrode 22 are horizontally aligned in this order.

When a sheet of low-melting metal foil 26 is applied on thermistor 14, third electrode 23 and second electrode 22 as such, thermistor 14, third electrode 23 and second electrode 22 are electrically connected to each other via low-melting metal foil 26.

Low-melting metal foil 26 consists of lead, tin, antimony or an alloy thereof having the property of blowing at low temperature, and low-melting metal foil 26 forms a main fuse 11 at the part between second electrode 22 and third electrode 23, and also forms an auxiliary fuse 12 at the part between thermistor 14 and third electrode 23.

Second electrode 22 is connected to the terminal of accumulator 7 on the high potential side and first electrode 21 is connected to external connection terminal 17 on the high potential side to complete protective circuit 6.

Thermistor 14 has a resistance value of about 10 mΩ at normal temperature, and heater 13 has a resistance value of about 20 Ω. When secondary battery 5 is attached to an electronic apparatus such as a cellphone to discharge accumulator 7, a current is therefore supplied to the electronic apparatus mainly via thermistor 14.

If external connection terminals 17, 18 are short-circuited by accident, a current first passes mainly through thermistor 14 because the resistance value of thermistor 14 is smaller, and once the resistance value of thermistor 14 increases by self-heating, a current begins to flow in heater 13.

When external connection terminals 17, 18 are short-circuited, main and auxiliary fuses 11, 12 do not blow and a current discharged from accumulator 7 continues to flow under the limitation by the resistance value of the parallel circuit consisting of thermistor 14 and heater 13 because the charging voltage of accumulator 7 for cellphones is a low voltage such as about 3.3V and therefore only a small current passes through main and auxiliary fuses 11, 12 and heater 13. When the charging voltage of accumulator 7 has been consumed, the current discharged becomes zero.

When external connection terminals 17, 18 recover from the short-circuit conditions, secondary battery 5 restores the state before the short circuit because main and auxiliary fuses 11, 12 do not blow even if external connection terminals 17, 18 are short-circuited as described above.

On the other hand, when external connection terminals 17, 18 are connected to an unsuitably high external DC voltage source for secondary battery 5 rather than short-circuited, a current first passes through thermistor 14 to increase the resistance value of thermistor 14 and then current passes through heater 13 in the same manner as described above, but a higher voltage is applied across protective circuit 6 than in the case where external connection terminals 17, 18 are short-circuited because a higher voltage is applied to external connection terminals 17, 18.

Thus, a larger current flows in heater 13 than in the case where external connection terminals 17, 18 are short-circuited, with the result that heater 13 generate a high heat, which blows main fuse 11.

Figure 5:
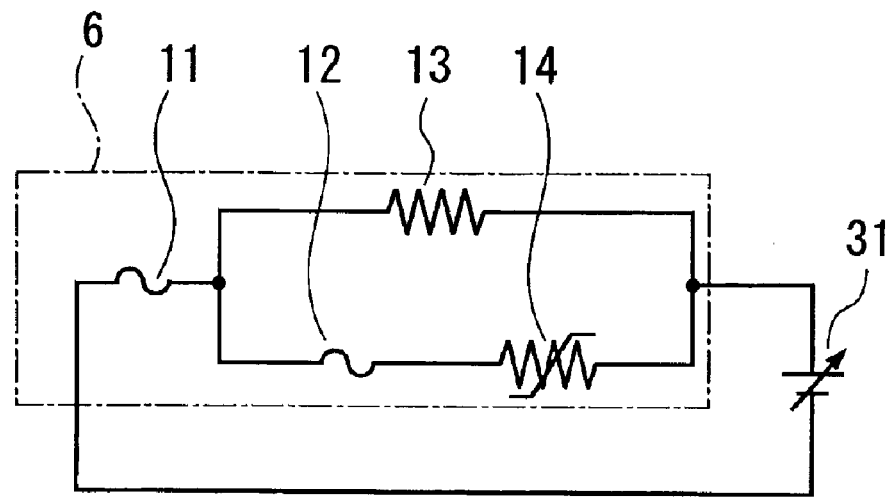
FIG. 5 is a circuit diagram of the protective circuit.
Figure 6:
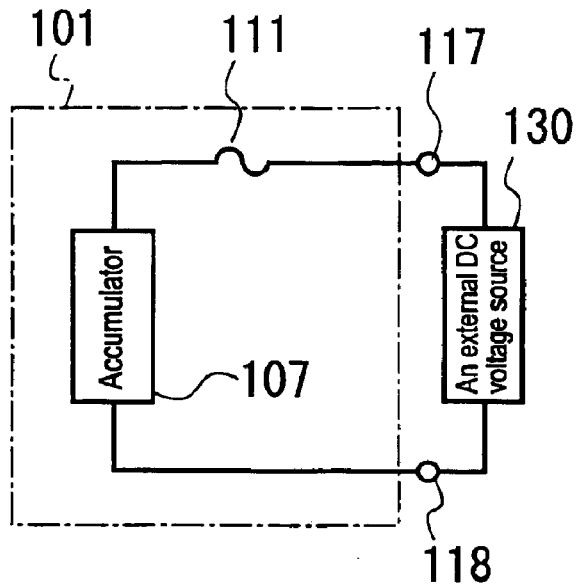
FIG. 6 is a diagram for illustrating an example of secondary battery of the prior art.
Figure 7:
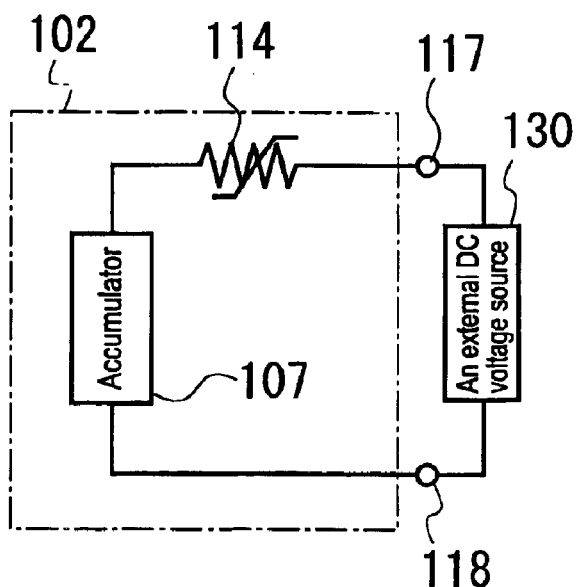
FIG. 7 is a diagram for illustrating another example of secondary battery of the prior art.

A protective circuit 6 of the present invention using a low-melting metal foil 26 consisting of a tin-antimony alloy (Sn:Sb=95:5, melting temperature 240° C.) was directly connected to a variable voltage source 31 at both ends as shown in FIG. 5 to examine the inner state of the protective circuit 6 with varying voltages applied.

The results arc shown in Table 1 below. The resistance value of heater 13 before voltage application is 18 Ω.

TABLE 1

| V | $I_{13}$ | $I_{14}$ | T |
|---|---|---|---|
| 3 | 0.08 | 0.08 | 50° C. |
| 5 | 0.12 | 0.04 | 100° C. |
| 8 | Fuse broken | — | — |
| 12 | Fuse broken | — | — |
| 24 | Fuse broken | — | — |

V: Applied voltage (V)
$I_{13}$: Current in the heater (A)
$I_{14}$: Current in the thermistor after operation of the thermistor (A)
T: Temperature of the heater When the voltage applied across protective circuit 6 is 8V, main fuse 11 blows.

If main fuse 11 does not blow, any high voltage is not applied to thermistor 14 in protective circuit 6 of the present invention because auxiliary fuse 12 blows.

As described above, main fuse 11 blows at an applied voltage of 8V or more, and therefore, main and auxiliary fuses 11, 12 were changed to a copper foil having a thickness of 35 μm substituted for low-melting metal foil 26 to measure the resistance value of thermistor 14.

The relationship between the applied voltage and the resistance value of thermistor 14 is shown in Table 2 below.

TABLE 2

| V | $R_{14}$ |
|---|---|
| 3 | 18 |
| 5 | 57 |
| 8 | 140 |

TABLE 2-continued

| V | $R_{14}$ |
|---|---|
| 12 | 1000 or more |
| 24 | 1000 or more |

V: Applied voltage (V)
$R_{14}$: Resistance value of the thermistor during operation (Ω)

An arc discharge was found to occur across thermistor 14 when a voltage of 12V or more was applied to thermistor 14.

Then, under the condition where thermistor 14 of protective circuit 6 was short-circuited, a voltage was applied across protective circuit 6 to measure the current passing through heater 13 and the temperature on the surface of heater 13.

The results are shown in Table 3 below.

TABLE 3

| V | $I_{13}$ | T |
|---|---|---|
| 3 | 0.16 | 150° C. |
| 5 | 0.27 | 180° C. |
| 8 | Fuse broken | — |
| 12 | Fuse broken | — |
| 24 | Fuse broken | — |

V: Applied voltage (V)
$I_{13}$: Current passing through the heater (A)

Because of the resistance value of 18 in heater 13, the current $I_{13}$ passing through heater 13 increases with the increase of the applied voltage and the temperature of heater 13 reaches 180° C. at an applied voltage of 5V.

When low-melting metal foil 26 consists of a tin-antimony alloy having a blowout temperature of 240° C., main fuse 11 breaks to shut off current if the applied voltage becomes 8V.

Although a tin-antimony alloy was used for low-melting metal foil 26 in the example above, the present invention is not limited thereto. For example, low-melting metals such as a bismuth-tin-lead alloy (Bi:Sn:Pb=52.5:32.0:15.5, melting temperature 95° C.) or a tin-silver alloy (Sn:Ag=97.5:2.5, melting temperature 226° C.) can be used.

When the current passing through the protective circuit during abnormal conditions is relatively small, current is limited by the thermistor, with the result that if normal state is regained, the secondary battery also recovers.

If a large current passes through the protective circuit during abnormal conditions, however, the main fuse blows to ensure safety.

What is claimed is:

1. A secondary battery comprising an accumulator, a protective circuit and external connection terminals;

wherein the protective circuit includes a heater that generates heat when a voltage is applied, a main fuse connected in series with the heater, so that the main fuse is heated by the heater and breaks at a specified blowout temperature, and a thermistor connected in parallel with the heater and having a resistance value that is increased by heating;

wherein when the external connection terminals are connected to a DC voltage source, a current supplied from the DC voltage source charges the accumulator through the protective circuit, and when the external connection terminals are connected to an electronic apparatus, a current discharged from the accumulator is supplied to the electronic apparatus through the protective circuit; and wherein the main fuse does not reach the blowout temperature under the current passing through the protective circuit when the external connection terminals are short-circuited, but the main fuse heats up to or above the blowout temperature when the external connection terminals are connected to a voltage source 1.5 times or more the rated charging voltage of the accumulator, provided that the accumulator is not charged to the full charge voltage.

2. A secondary battery comprising an accumulator, a protective circuit and external connection terminals;

wherein the protective circuit includes a heater that generates heat when a voltage is applied, a main fuse connected in series with the heater, so that the main fuse is heated by the heater and breaks at a specified blowout temperature, a thermistor having a resistance value that is increased by heating, and an auxiliary fuse connected in series with the thermistor, and a series circuit consisting of the thermistor and the auxiliary fuse is connected in parallel with the heater;

wherein when the external connection terminals are connected to a DC voltage source, a current supplied from the DC voltage source charges the accumulator through the protective circuit, and when the external connection terminals are connected to an electronic apparatus, a current discharged from the accumulator is supplied to the electronic apparatus through the protective circuit.

3. A secondary battery comprising an accumulator, a protective circuit and external connection terminals;

wherein the protective circuit includes a heater that generates heat when a voltage is applied, a main fuse connected in series with the heater, so that the main fuse is heated by the heater and breaks at a specified blowout temperature, a thermistor having a resistance value that is increased by heating, and an auxiliary fuse connected in series with the thermistor, and a series circuit consisting of the thermistor and the auxiliary fuse is connected in parallel with the heater;

wherein when the external connection terminals are connected to a DC voltage source, a current supplied from the DC voltage source charges the accumulator through the protective circuit, and when the external connection terminals are connected to an electronic apparatus, a current discharged from the accumulator is supplied to the electronic apparatus through the protective circuit;

wherein the main fuse does not reach the blowout temperature under current passing through the protective circuit when the external connection terminals are short-circuited, but the main fuse heats up to or above the blowout temperature when the external connection terminals are connected to a voltage source 1.5 times or more the rated charging voltage of the accumulator, provided that the accumulator is not charged to the full charge voltage.

* * * * *